United States Patent Office 3,438,987
Patented Apr. 15, 1969

3,438,987
MELAMINE PRODUCTION
Kurt Scheinost, Tacherting, Germany, assignor to Suddeutsche Kalkstickstoff-Werke Aktiengesellschaft, Trostberg, Uppper Bavaria, Germany
No Drawing. Filed Oct. 31, 1966, Ser. No. 590,526
Claims priority, application Germany, Nov. 3, 1965, S 100,337
Int. Cl. C07d 55/26
U.S. Cl. 260—249.7                                    4 Claims

ABSTRACT OF THE DISCLOSURE

Melamine is prepared from dicyanodiamide in a fluidized bed catalyst system at a temperature of 300–450° C. by means of a current of ammonia, the catalyst being in the form of a mixed gel which contains 5–20% by weight of $Al_2O_3$, calculated on the anhydrous basis, the balance being $SiO_2$. The $Al_2O_3$ and $SiO_2$ are at least partially present in chemical linkage in the gel. The catalyst is formed by co-precipitating both oxide hydrates to form an aluminum silicate or to form a silicoaluminum acid. By use of such catalyst form, improved melamine yields of 98.5 to 99.0% are obtained with a melamine purity of 99.9%.

---

This invention relates to the preparation of melamine from dicyanodiamide.

Various methods are known where dicyanodiamide is converted to melamine by heating the dicyanodiamide at a temperature of 180 to 450° C. at atmospheric or elevated pressures in contact with a catalyst bed maintained in turbulent motion by ammonia gas (DAS 1,117,592 and 1,167,350; British Patent No. 884,038; Rev. chim. Bucharest, 9 (1958), pp. 509–510). As suitable catalysts, there have been proposed porous active adsorbents such as oxide hydrates of $SiO_2$, $Al_2O_3$, $TiO_2$, $ZrO_2$, $ThO_2$, and mixtures thereof, also activated fuller's earth, infusorial earth, active carbon, pumice, and others. All said adsorbents should have a large inner surface, a specific surface of 100 to 1000 m.²/g. or pores with a larger range of diameters than the melamine molecules.

The drawback of all those known methods is that they give melamine yields of only 85 to 92 percent, the purity of the obtained melamine being not more than 90–95 percent. For this reason, said methods could not displace the commercial methods using a batch process under high pressure, which attain melamine yields of 99% with up to 99% purity.

In my copending application Ser. No. 507,373, filed Nov. 12, 1965, now Patent No. 3,357,980, a method has been disclosed to obtain melamine in higher yields and of better purity by using as starting material dicyanodiamide which has a smaller particle size than the catalyst. A turbulence zone containing the catalyst and maintained at a temperature of 300–400° C. is produced by means of a current of ammonia, and the dicyanodiamide particles are introduced laterally at high speed and dispersed homogeneously in said zone, while the sublimed melamine is then precipitated at a temperature above 150° C. Under such conditions, melamine yields of 98.5–99.0% are obtained, and the melamine has a purity of 99.9%.

The principal object of this invention is to provide a method for the preparation of melamine from dicyanodiamide where the yield and purity of the obtained melamine are not affected by irregular feed of the dicyanodiamide and temporary overloads and where the particle size of the dicyanodiamide can be essentially disregarded.

Other objects and advantages will be apparent from a consideration of the specification and claims.

For my new method, I use also the basic process described in the introduction where dicyanodiamide is heated at 300–450° C. in the presence of ammonia under normal or elevated pressure in the fluidized bed of a catalyst having a large inner surface and where the formed melamine is sublimed off and recovered at temperatures above 150° C.

In accordance with the invention, I use as catalyst a mixed gel which contains 5 to 20 percent by weight of $Al_2O_3$, the balance being substantially $SiO_2$. The two components must be present at least partially in chemically bonded state.

For the preparation of the catalyst, it is not sufficient to mix simply silica gel and alumina gel in the required proportions. In order to obtain a suitable catalyst, both oxide hydrates must be precipitated together; it appears that in such procedure, at least partial chemical linkage to an aluminum silicate or to a silicoaluminum acid takes place. However, catalysts of good activity can also be obtained by acid activation of natural materials having the composition stated hereinabove.

In contrast to the catalysts used heretofore, which were porous adsorbents defined only by their specific surface or their pore diameter, the new catalysts do not form desamination products of melamine, or they reconvert such desamination products by introducing therein ammonia so quickly to melamine as to suppress their appearance. In this way, also the slow blockage of the catalysts by deposited desamination products is prevented.

The catalysts proposed heretofore for the melamine synthesis from dicyanodiamide in a turbulent layer either give low yields of a melamine having unsatisfactory purity, or they are blocked within a short time by desamination products of melamine and become ineffective. To the first group, there belongs, for instance, active alumina while silica gels belong to the second group. $SiO_2$–$Al_2O_3$ mixed gels having a lower $Al_2O_3$ content than corresponding to the composition defined hereinabove have properties approaching those of pure silica gels; the properties of mixed gels having a higher $Al_2O_3$ content than required for this invention approach those of pure alumina gels.

Use of the novel catalysts presents the following advantages:

(a) They are not sensitive to uneven feed of dicyanodiamide and momentary overloads;

(b) For this reason, they allow, for a given catalyst volume, a higher hourly passage of dicyanodiamide than the prior art catalysts;

(c) They require substantially no regeneration, or regeneration in intervals only of several months, to be freed of blocking by-products;

(d) Surprisingly, they allow a simplification of the process because it was found that dicyanodiamide of any particle size can be used, provided that its particle size is smaller than the size of the catalyst particles. This allows the use of commercially produced dicyanodiamide without the size limitations required heretofore.

Said unexpected behavior of the novel catalysts may be explained by their strong acidity, which is due to their lattice arrangement and in contrast to the neutral aluminum oxides and the weakly acid silica gels. As a result, in reactions proceeding in the presence of ammonia, the active surface of said catalysts will show a considerably higher ammonia concentration than other porous active adsorbents. Such higher ammonia concentration at the place of the melamine formation from dicyanodiamide favors such formation and reduces or prevents completely the desamination of already formed melamine to melam or melem which takes place with splitting off of ammonia.

The amount of dicyanodiamide which can be reacted per unit of time on the novel catalysts, depends to a certain extent on the specific surface of the catalysts. In order to avoid unnecessary reduction of the dicyanodiamide feed, it is of advantage to use catalysts having a specific surface which is not smaller than 100 m.²/g.

The amount of catalyst required to form 1 kg. of melamine is, for equal reaction temperatures, a function of the amount of ammonia used. The more ammonia is employed as gas for producing the turbulence of the catalyst bed or as carrier gas for the sublimation, the smaller can be the amount of catalyst, and vice versa.

The following examples illustrate the invention. All parts are given by weight, unless indicated otherwise.

EXAMPLE 1

In a turbulent bed reactor of 100 mm. inner diameter, 4 liter of a catalyst were used which consisted of a coprecipitated mixed $SiO_2$—$Al_2O_3$ gel containing 8 percent by weight of $Al_2O_3$, calculated on anhydrous substance. The size of the catalyst grains was 0.5 to 0.75 mm. The temperature of the fluidized bed was maintained by means of an electrically heated jacket at 350±10° C. The catalyst was kept in turbulent motion by 5.1 Nm.³/h. of ammonia which was preheated to 150° C. Through a water cooled nozzle which was laterally and horizontally provided in the wall of the reactor, 440 g./h. of commercial dicyanodiamide were continuously injected into the fluidized bed of the catalyst by means of 400 Nl./h. of ammonia.

The ammonia-melamine vapor mixture leaving the reactor was filtered at 350° C. through a ceramic filter and then passed into a melamine separator kept at 150° C. where the melamine was precipitated by condensation.

After 17 hours of operation, 7,360 g. of sublimed 99.9% melamine were recovered from the separator. This corresponded to a melamine yield of 98.3 percent. The catalyst was still free-flowing, and its nitrogen content (excl. ammonia nitrogen) was with 6.3% N after 17 hours still the same as after the first hour.

EXAMPLE 2

Example 1 was repeated but a coprecipitated $SiO_2$-$Al_2O_3$ mixed gel catalyst containing 15% of $Al_2O_3$ was used. Under otherwise the same conditions, there were obtained after 20 hours of operation 8,695 g. sublimed 99.9% melamine, corresponding to a melamine yield of 98.7%.

EXAMPLE 3

Example 1 was repeated with the modification that the dicyanodiamide was not continuously charged but that the hourly amount of 440 g. was injected into the fluidized catalyst bed as fast as possible in 30 substantially equal portions in intervals of 2 minutes. Thereby, the ammonia current of 400 Nl./h. for the injection was maintained. Under otherwise the same conditions, the same melamine yield and the same purity of the sublimate were obtained as in Example 1.

EXAMPLE 4

This example was carried out like Example 3 but the hourly dicyanodiamide amount was injected in 4 portions of 110 g. each in intervals of 15 minutes, each time within 3 to 4 minutes, with the ammonia current which was continuously maintained at 400 Nl./h. Also in this example, the same results were obtained as in Example 1.

The following comparative examples were carried out like Example 1 but with $SiO_2$-$Al_2O_3$ catalysts which were not prepared as required or had not the required composition.

EXAMPLE 5

For this example, a catalyst was used which had been obtained by coprecipitation of $SiO_2$ and $Al_2O_3$ but contained only 1% by weight of $Al_2O_3$. After 20 hours, there were obtained 8,052 g. of a sublimate which contained 94.1 percent by weight of melamine. This corresponded to a yield of 86.1%.

EXAMPLE 6

For this example, a coprecipitated $SiO_2$-$Al_2O_3$ mixed gel catalyst containing 25% by weight of $Al_2O_3$ was employed. After 20 hours, 8,301 g. of a sublimate containing 95.4% of melamine were obtained, corresponding to a yield of 90.0 percent.

EXAMPLE 7

A catalyst was used which had been prepared by precipitating silica gel and adding, during precipitation, finely ground active alumina in an amount to obtain 8% of $Al_2O_3$ in the finished catalyst. When such catalyst was used in the method of Example 1, 7,066 g. of a sublimate were obtained after 17 hours which contained 90.5 percent of melamine, corresponding to a melamine yield of 85.5 percent.

I claim:

1. In the process for the preparation of melamine which comprises heating at a temperature of 300 to 450° C. dicyanodiamide in the bed of a catalyst having a large inner surface and being fluidized by a current of ammonia, the improvement wherein the catalyst is in the form of a mixed gel containing 5 to 20 percent by weight of $Al_2O_3$, the balance being substantially $SiO_2$, said $Al_2O_3$ and $SiO_2$ being at least partially present in chemical linkage.

2. The process as claimed in claim 1 wherein said catalyst is prepared by coprecipitation of the two oxide hydrates.

3. The process as claimed in claim 1 wherein said $Al_2O_3$ and said $SiO_2$ are at least partially present in chemical linkage in the form of an aluminum silicate.

4. The process as claimed in claim 1 wherein said $Al_2O_3$ and said $SiO_2$ are at least partially present in chemical linkage in the form of a silicoaluminum acid.

References Cited

UNITED STATES PATENTS 2,783,131   2/1957   Mackay et al. ___ 260—249.7 XR

FOREIGN PATENTS 884,038   12/1961   Great Britain.

HENRY R. JILES, *Primary Examiner.*

JOHN M. FORD, *Assistant Examiner.*